United States Patent [19]
Stojic

[11] Patent Number: 6,164,187
[45] Date of Patent: Dec. 26, 2000

[54] DIAPHRAGM RETAINER FOR SPRING BRAKE ACTUATOR

[75] Inventor: Steven M. Stojic, Holland, Mich.

[73] Assignee: Holland Neway International, Inc., Muskegon, Mich.

[21] Appl. No.: 09/105,112

[22] Filed: Jun. 26, 1998

Related U.S. Application Data

[60] Provisional application No. 60/055,837, Aug. 15, 1997.

[51] Int. Cl.[7] ........................................... F01B 7/00
[52] U.S. Cl. ...................................... 92/63; 92/99
[58] Field of Search ............................ 92/63, 99

[56] References Cited

U.S. PATENT DOCUMENTS

| | | | |
|---|---|---|---|
| 5,105,727 | 4/1992 | Bowyer . | |
| 5,226,291 | 7/1993 | Osterday et al. ........................... | 92/99 |
| 5,377,579 | 1/1995 | Pierce .......................................... | 92/63 |

FOREIGN PATENT DOCUMENTS

| | | | |
|---|---|---|---|
| 196 23 099 C1 | 10/1997 | Germany ......................... | F16D 65/32 |

*Primary Examiner*—F. Daniel Lopez
*Assistant Examiner*—Hermes Rodriguez
*Attorney, Agent, or Firm*—Radar, Fishman, Grauer & McGarry, An Office of Rader, Fishman & Grauer PLLC

[57] ABSTRACT

A spring brake actuator (10), with a first spring brake chamber (76) filled with compressed air and a second spring brake chamber (78) housing a large-force compression spring (82), includes an elastomeric diaphragm (74) having a centrally-disposed aperture (90) separating the first and second spring brake chambers (76 and 78). The elastomeric diaphragm (74) is compressed at a peripheral edge (138) between housing sections (66, 68) and at a collar (140), which is adjacent the centrally-disposed aperture (90), between a ring-shaped retainer (142) and at least one of an actuator rod, a pressure plate (92), and an annular recess (144) in a pressure plate (92). In one embodiment, the retainer (142) includes an annular channel (154) having an inner rim (150), an outer rim (152), and a base (156). Evenly-spaced flanges (146) radiate axially from, and are separated by slots (148) on, the inner rim (150). The groove (144) is adapted to receive the base (156) of the channel (154), with the collar (140) of the elastomeric diaphragm (74) secured therebetween, and the flanges (146) secure the retainer (142) therein. In a further embodiment, the retainer (242) includes an inner rim (150) having a flange (256), a ramped outer rim (252), and a base (290). The annular recess (244) is adapted to receive the base (156) of the channel (154) and the flange (256), with the collar (240) of the elastomeric diaphragm (274) secured therebetween, whereby the friction fit aided by the ramped outer rim (252) and the flange (256) secures the retainer (242) therein.

13 Claims, 4 Drawing Sheets

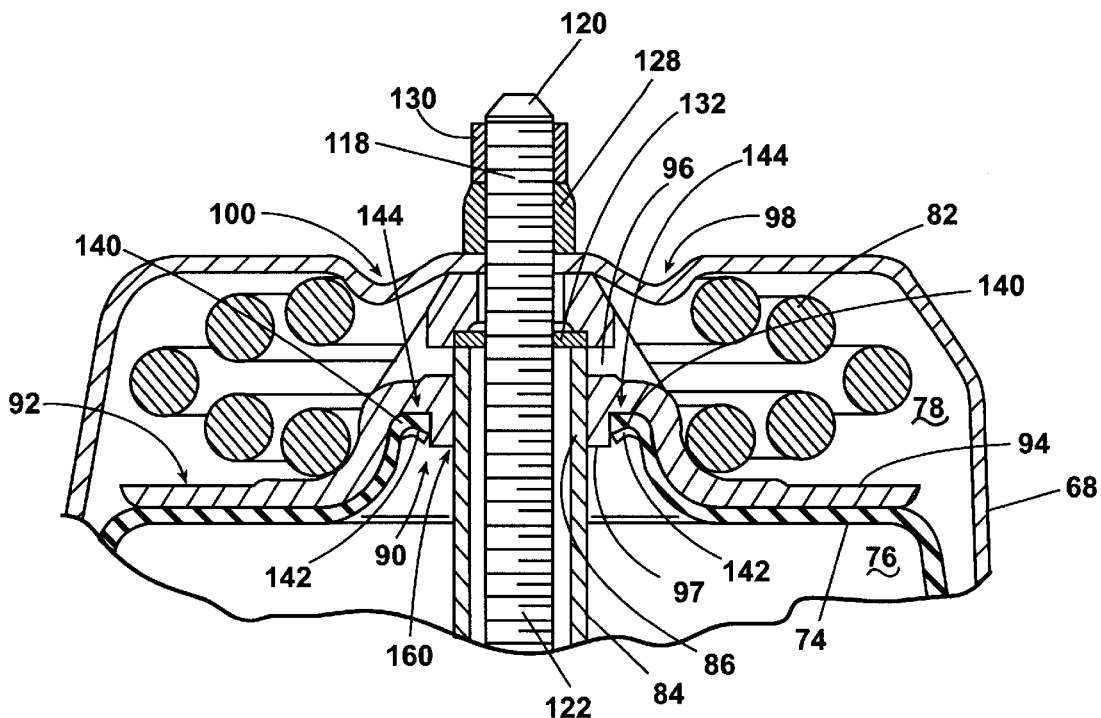
Fig. 2A
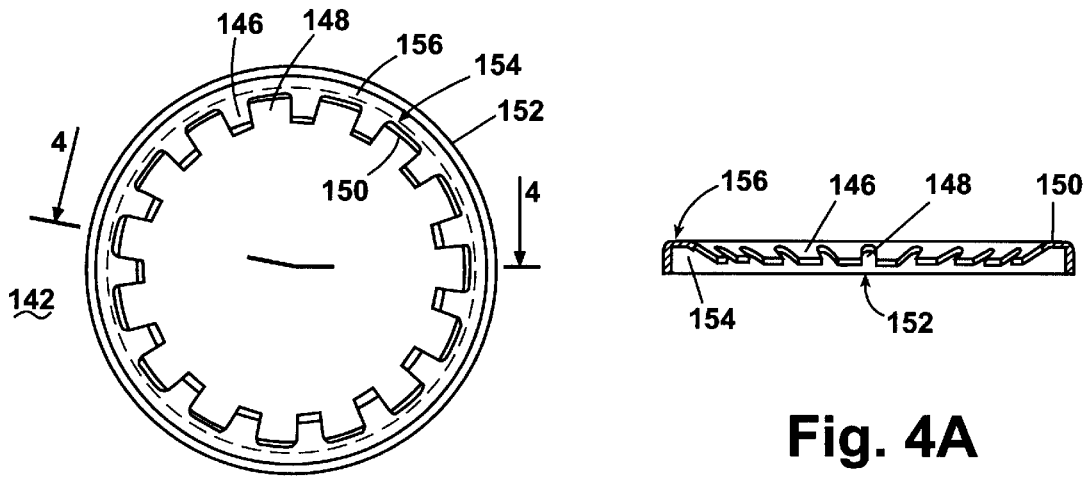
Fig. 3A
Fig. 4A

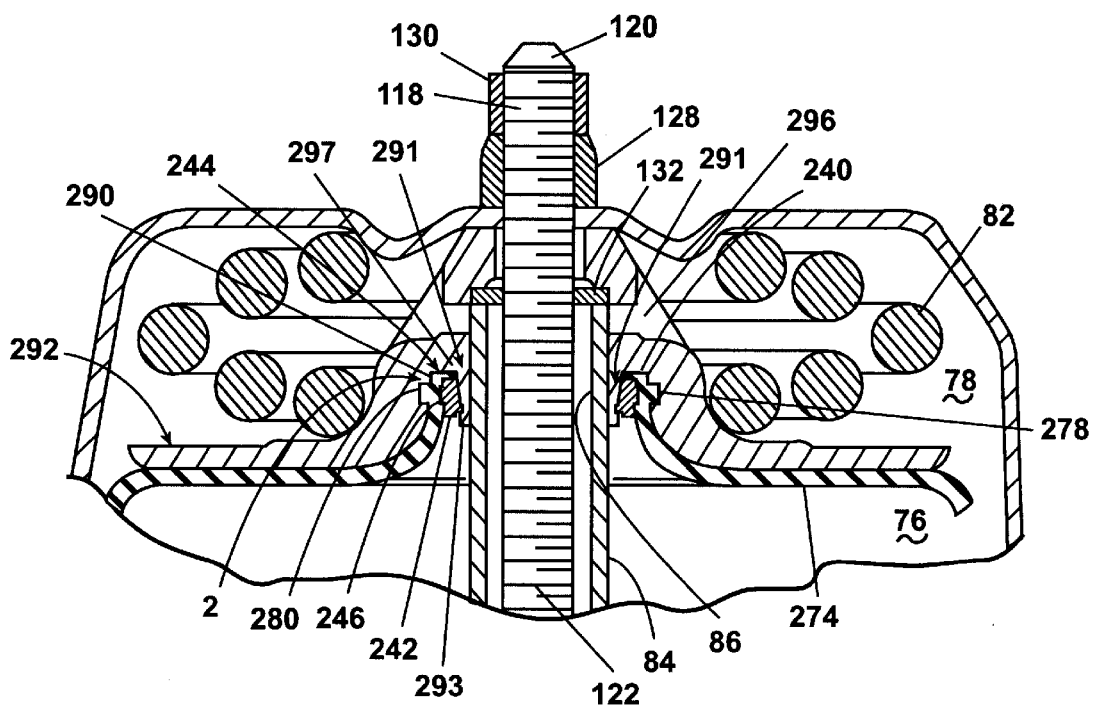
Fig. 2D
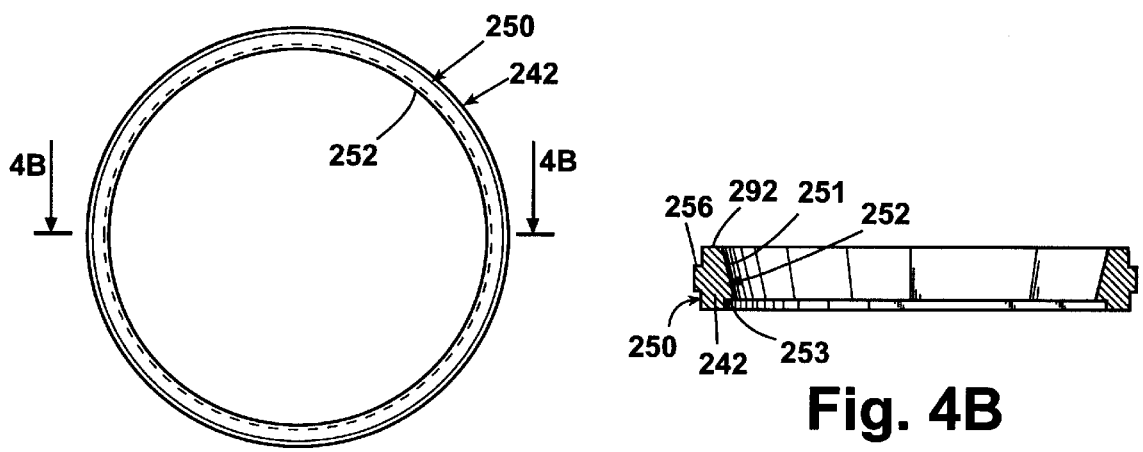
Fig. 3B
Fig. 4B

DIAPHRAGM RETAINER FOR SPRING BRAKE ACTUATOR

This application claims the benefit of U.S. Provisional Application Ser. No. 60/055,837 filed on Aug. 15, 1997.

BACKGROUND OF THE INVENTION

1. Field of the Invention

The invention relates to air-operated diaphragm brakes for vehicles and particularly to combination service and spring brake actuator assemblies.

2. State of the Prior Art

An air brake system for a vehicle such as a bus, truck or the like typically includes a brake shoe and drum assembly which is actuated by means of an actuator assembly operated by the selective application of compressed air. Conventional air brake actuators have both a service brake actuator for actuating the brakes under normal driving conditions by the application of compressed air and a spring-type emergency brake actuator which causes actuation of the brakes when air pressure has been released. The emergency brake actuator includes a strong compression spring which forces application of the brake when air is released. This is often referred to as the spring brake.

Typically, the spring brake actuator is disposed in tandem with the service brake actuator. When full pressure is applied to the spring brake actuator, air pressure acting against a diaphragm compresses the compression spring. A spring brake actuator rod, operably connected between the diaphragm and the service brake actuator does not affect the operation of the service brake. When the brake is to be applied during normal driving operation, compressed air is provided to the service brake actuator which, acting against a diaphragm, causes a service brake push rod to be extended and causes the brakes to be applied with an application force which is proportional to the air pressure applied to the service brake actuator. In the event of a loss of air pressure or an intentional exhaustion of air from the spring brake actuator, the brake will be mechanically activated by the force of the compression spring acting on the spring brake actuator rod which in turn acts upon the service brake push rod to apply the brakes. Thus, the spring brake portion serves both as a parking brake and an emergency brake.

In a typical prior art air brake system, the spring brake actuator and the service brake actuator are disposed in a single housing comprising a spring brake portion and a service brake portion. The service brake portion includes an air chamber partially defined by a flexible service diaphragm acting against a service brake push rod and a return spring to assure proper release of the brake when air is exhausted from the air chamber. The spring brake portion includes a spring chamber and an air chamber, both partially defined by a spring brake diaphragm acting against a spring pressure plate to compress the compression spring in the spring chamber when air pressure is applied to the spring brake diaphragm in the air chamber. In some applications, the spring brake actuator rod extends through the spring brake diaphragm to be received by a tubular recess in the pressure plate, thereby integrally connecting to the pressure plate.

In operation, the spring brake actuator rod is pushed outwardly from the air chamber through a housing opening and bearing provided with a pneumatic seal to engage the service diaphragm and push rod of the service brake, thereby causing the brake to be applied. The spring brake diaphragm is provided with a centrally disposed aperture having an annular edge and the actuator rod extends through the opening and engages the annular edge to form an airtight seal against the tubular recess in the pressure plate. The actuator rod is hollow with a central bore and includes a brake releasing cage bolt which extends into the central bore. An end plate on the caging bolt engages the spring brake pressure plate to draw the spring to a compressed state when the spring is caged by rotation of the bolt.

Prior art brake assemblies suffer from several problems including the multiplicity of parts, the cost of the various parts of the brake assembly, and the various assembly steps required in manufacture of the brake assembly. Simplifying the method of manufacture and increasing the reliability of the product, through reducing the number of parts or increasing the quality of the parts employed, are overriding goals of brake assembly design.

The conventional spring brake assembly, as detailed above, includes a spring brake actuator rod formed integral with a spring brake pressure plate and secured to the spring brake diaphragm. The conventional method of securing a spring brake diaphragm with a centrally-disposed aperture having an annular edge requires sealing the annular edge of the diaphragm to the actuator rod where it extends through the diaphragm aperture to form an airtight seal. More specifically, the annular edge of the centrally-disposed aperture opening is clamped between a portion of the tubular recess in the pressure plate and the actuating rod to form the airtight seal. The tubular recess of the pressure plate is provided with an expanded portion for accommodating the collar of the diaphragm and further pressing the collar against the outside surface of the actuating rod to maintain an airtight attachment between the actuating rod and the diaphragm. This is the structure disclosed by Bowyer, U.S. Pat. No. 5,105,727.

While the aforementioned design provided several advantages tending to reduce the cost of manufacture, including inside diameter retention, pressure seal of the diaphragm, and rigid attachment of the actuating rod to the pressure plate, the design required a groove in the tubular recess of the pressure plate for receiving the annular edge of the diaphragm, which is costly to produce. Also, the design did not preserve valuable surface area within the pressure plate's tubular recess, which is circumferentially press-fit on the actuating rod. This design results in the need for a larger tubular recess for receiving and securing the actuating rod because its surface area is partially consumed by the internal groove accommodating the annular edge of the diaphragm. Moreover, replacement of the diaphragm is expensive and time consuming because it requires removal of the actuating rod from the pressure plate's tubular recess, which are in press-fit connection.

SUMMARY OF THE INVENTION

An elastomeric diaphragm secured to at least one of the pressure plate or the acuatoe rod by a diaphragm retainer according to the invention addresses these and other disadvantages of the prior art, particularly the need to reduce manufacturing and repair costs, as well as conserve valuable surface area within the tubular recess of the pressure plate. The diaphragm retainer pneumatically seals the diaphragm to a lower face of the pressure plate, or outside surface of the actuator rod, proximate the tubular recess that receives the actuating rod in a press-fit manner.

BRIEF DESCRIPTION OF THE DRAWINGS

FIG. 2a is an enlarged portion of the cross-sectional view of FIG. 1 to show greater detail;

FIG. 2d is a cross-sectional view of a further embodiment of a diaphragm-type spring brake actuator with a pressure plate, actuating rod, and diaphragm retainer ring according to the invention;

FIG. 3a is a bottom plan view of the diaphragm retainer of FIGS. 1 and 2a;

FIG. 3b is a bottom plan view of the diaphragm retainer of FIG. 2d.

FIG. 4a is a cross-sectional view of the diaphragm retainer taken along line 4a—4a in FIG. 3; and FIG. 4b is a cross-sectional view of the diaphragm retainer taken along line 4b—4b in FIG. 3.

DETAILED DESCRIPTION

Figure 1:
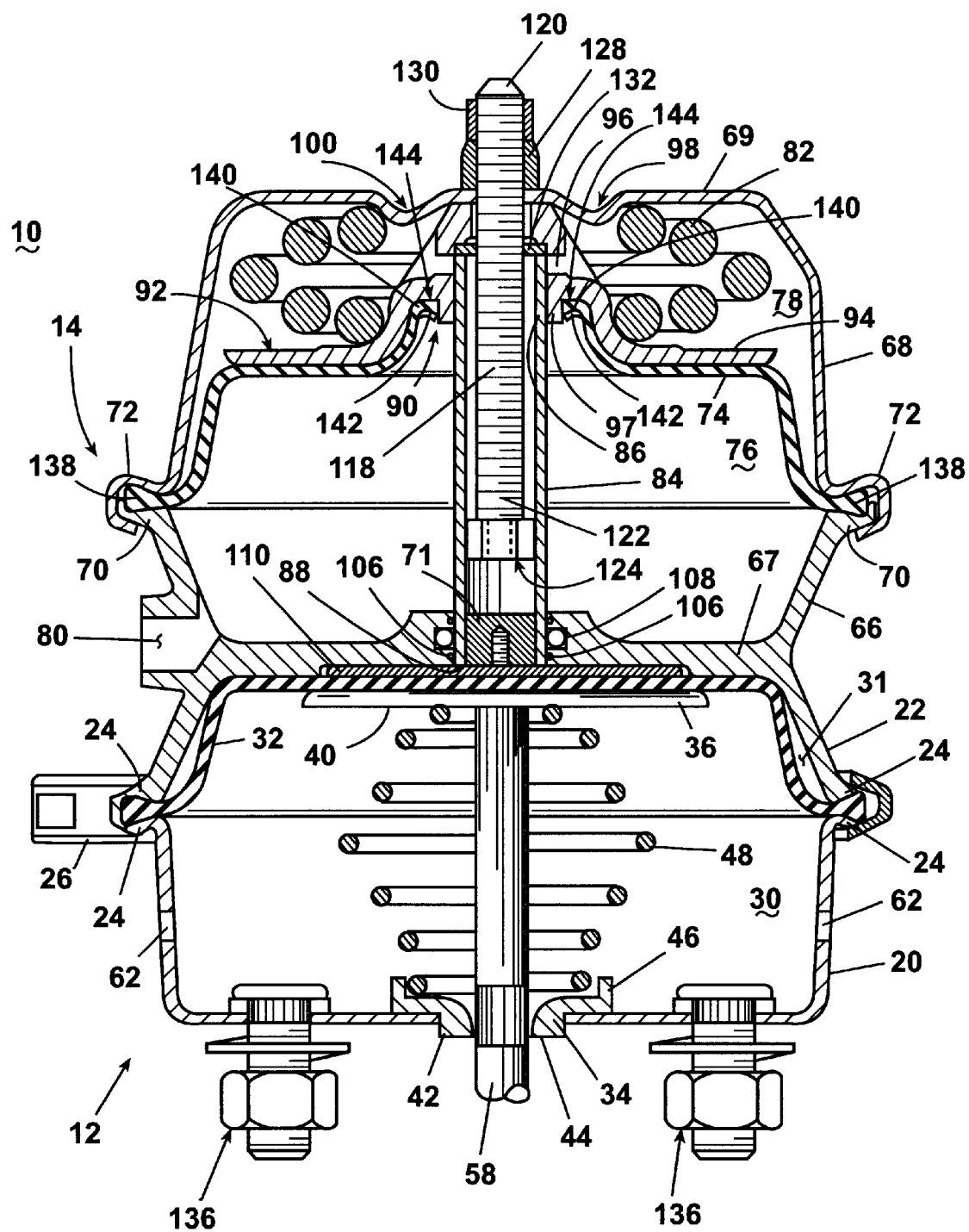
FIG. 1 is a cross-sectional view of a diaphragm-type spring brake actuator with a pressure plate and diaphragm retainer ring according to the invention.

FIG. 1 shows a cross-sectional view of an air-operated brake actuating unit 10 having a general configuration well known in the art and modified according to the teachings of this invention. The actuating unit 10 comprises a service brake portion 12 mounted in tandem to a spring brake or emergency brake portion 14. A service rake push rod 58 extends from the service brake 12 and is adapted to operably connect to a conventional brake shoe and drum (not shown in the drawing) in a standard fashion. Reciprocating motion of the push rod 58 will cause the brake to be alternately applied and released.

The service brake 12 comprises a pair of facing cup-shaped housing sections 20 and 22, each having an outwardly directed flange edge 24. An elastomeric diaphragm 32 is compressed at the peripheral edge thereof between flange edges 24 of the housing sections 20, 22. The housing sections 20, 22 are clamped together at their flange edges by means of a clamp 26 to form a first service brake chamber 30 and a second service brake chamber 31 on either side of the diaphragm 32, which is suspended within the space enclosed by the housing sections 20, 22. The housing section 20 is provided with a central opening 34 therein. The service brake push rod 58 extends through the opening 34 in housing section 20 and into the first service brake chamber 30 where it terminates in a pressure plate 36 which bears against the diaphragm 32. A push rod guide 42 is disposed around the central opening 34 and comprises a sleeve 44 having a radially-extending flange thereon which forms a spring seat 46. A compression spring 48 extends between the base 40 of the pressure plate 36 and the spring seat 46 of the push rod guide 42. The push rod guide 42 acts to center the spring 48 around the opening 34. The spring 48 thus tends to urge the pressure plate 36 and the service brake push rod 18 to a fully retracted position shown in FIG. 1.

The spring brake 14 comprises a pair of facing cup-shaped housing sections 66, 68. Housing sections 22, 66 are typically formed of an integral cast piece, although they can be formed of back-to-back cup shaped stamped or fabricated pieces. housing sections 66 and 68 are each provided with an outwardly directed circumferential flange edge 70 and a peripheral curved edge 72, respectively. The housing sections 66 and 68 are clamped together by means of the curved edge 72 on housing section 68 engaging edge 70 on housing section 66.

The edges 70, 72 of the housing sections 66, 68 also compress therebetween a peripheral edge 138 of an elastomeric diaphragm 74 having a centrally disposed aperture 90 defined by a collar 140. The elastomeric diaphragm 74 divides the interior of the spring brake 14 into a first spring brake chamber 76 and a second spring brake chamber 78, and the aperture 90 is sealed at the collar 140 in a manner hereinafter explained in accordance with the invention. The first spring brake chamber 76 is normally filled with compressed air typically supplied through an emergency or spring brake port 80 in housing section 66 when the emergency brake is in its normal, released position as illustrated. The second spring brake chamber 78 contains a large-force spring 82 in compression between a pressure plate 92 and the housing section 68.

A hollow actuator rod 84, having a proximal end 86 and a distal end 88, extends through the aperture 90 and terminates in a tubular recess 160 in the pressure plate 92 which engages the compression spring 82. The pressure plate 92 comprises a substantially flat portion 94 engaging one end of the spring 82 and a tubular or frustoconical stem 96 substantially enclosing the tubular recess 160 therewithin and extending coaxially with the axis of the spring 82. The stem 96 is press fit onto the proximal end 86 of the actuator rod 84 such that the tubular recess receives the proximal end 86 and the pressure plate 92 and the actuator rod 84 form an integral unit. An annular recess 98 in an end wall of the housing section 68 serves as a seat for the spring 82 and also provides rigidity to the end wall against the force of the spring 72. The annular recess 98 is provided with weep holes 100.

The stem 96 also extends through the aperture. In a first embodiment, as shown in FIG. 2a, the pressure plate 92 has an annular recess 144 adjacent to the stem 96 that receives the collar 140. In accordance with the invention, the diaphragm 74 is compressed between a ring-shaped retainer ring 142 and the pressure plate 92 in the recess 144. Preferably, the recess is formed integrally with the pressure plate 92 so that it will not have to be separately machined.

Figure 2B:
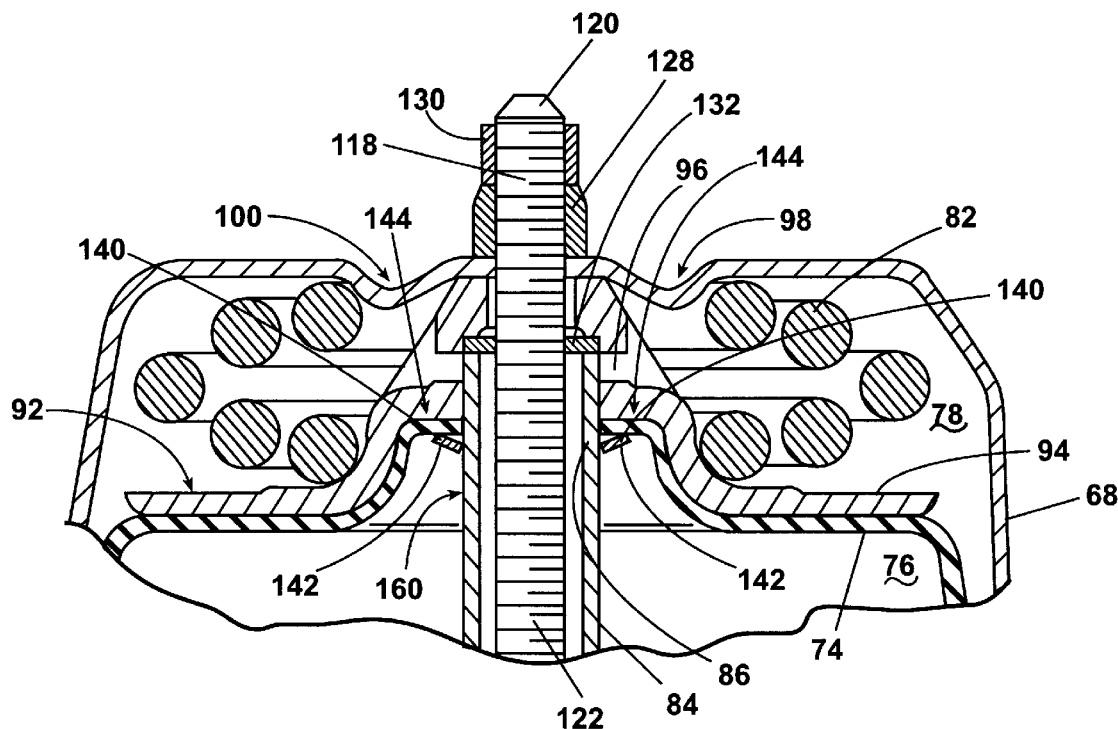
FIG. 2b is a cross-sectional view of a further embodiment of a diaphragm-type spring brake actuator with a pressure plate, actuating rod, and diaphragm retainer ring according to the invention.

In a second embodiment, as illustrated in FIG. 2b, the retainer ring 142 compresses the diaphragm 74 against the pressure plate 192, which does not necessarily include a collar nor an annular recess, and in abutment with the actuator rod 84. Of course, this assembly could be simply modified within the spirit of this invention by having the retainer ring 142 compress the diaphragm 74 at a point on the pressure plate 192 more distal from the actuator rod 84.

Figure 2C:
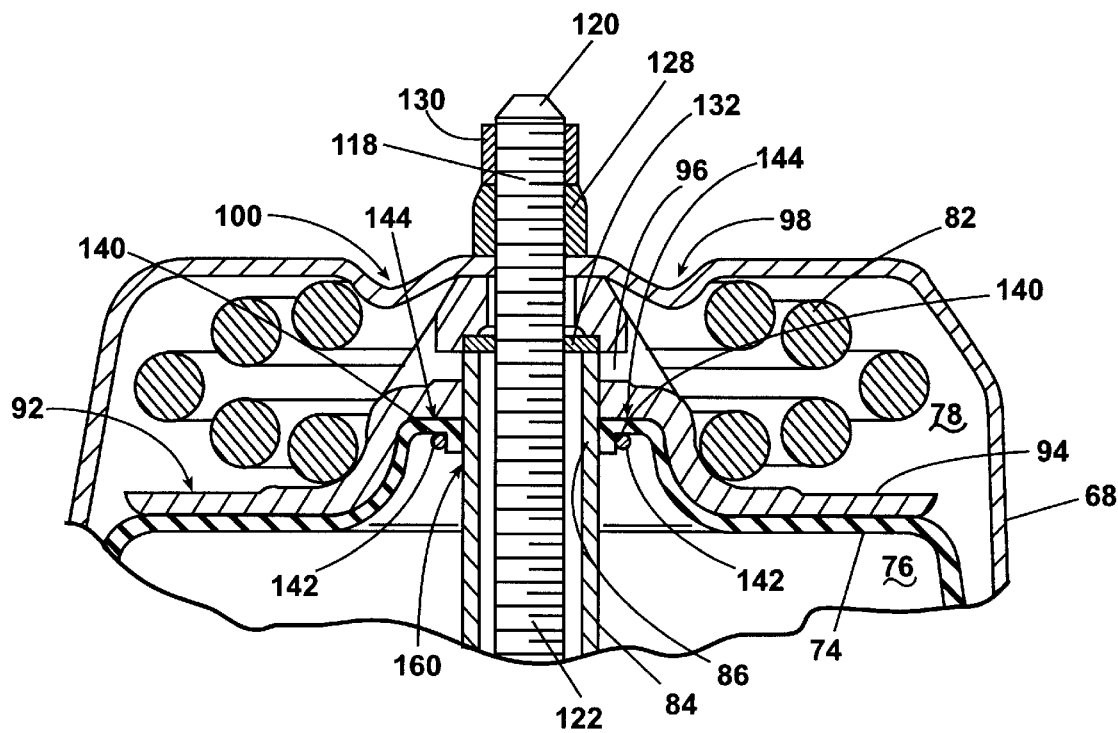
FIG. 2c is a cross-sectional view of another embodiment of a diaphragm-type spring brake actuator with a pressure plate, actuating rod, and diaphragm retainer ring according to the invention.

In a further embodiment, illustrated best in FIG. 2c, the retainer ring 142 compresses the diaphragm 74 against the actuator rod 84 and in abutment with the pressure plate 192. This assembly is simply modified within the spirit of the invention by having the retainer ring 142 compress the actuator rod 84 at a point more distal from the pressure plate 192.

The retainer ring 142, as illustrated in FIGS. 3a and 4a, includes a channel 154 having an inner rim 150, an outer rim 152, and a base 156. Flanges 146 radiate inwardly from the inner rim 150, and are separated by slots 148. They are bent in the same direction, at an angle off the radial plane. Ideally, the retainer ring 142 will be made of spring steel or similar material so that the flanges 146 will flex elastically. In the preferred embodiment shown in FIG. 3a, the fifteen slots 148 are evenly spaced at approximately twenty-four degrees, but more or fewer may be used. The recess 144 of the pressure plate 92 is adapted to receive the base 156 of the channel 154 with the collar 140 of the elastomeric diaphragm 74 secured therebetween. When fully inserted, the flanges 146 engage the outer surface of the stem 96 and flex inwardly to grip the stem and the peripheral edge of the collar 140, thereby trapping the collar 140 between the retainer ring 142 and the pressure plate 92. The flanges' inherent resistance against outward flexion exerts pressure on the retainer ring 142 in the direction of full insertion, thereby assisting pneumatic sealing of the diaphragm at the collar 140.

An alternative embodiment of a pressure plate 292 and retainer ring 242 are shown best in FIG. 2d. The pressure plate 292 includes an annular recess 244 adjacent to the stem 296 that receives a collar 240 of a diaphragm 274. In accordance with the invention, the diaphragm 274 is compressed between the ring-shaped retainer ring 242 and the pressure plate 292 in the recess 244. Preferably, the recess 244 is formed integrally with the pressure plate 92 so that it will not have to be separately machined. Further, the recess 244 includes a first sidewall 290 having a transversely oriented channel 280 formed therein. A second sidewall 291 includes a tab 293 extending inwardly and generally transverse to the sidewall 291.

The retainer ring 242, as illustrated in FIGS. 3b and 4b, includes a base 292, a centrally disposed flange 256 on an inner rim 250 and a ramp 251 on an outer rim 252. The flange 256 is adapted for reception in a channel 246 formed in the diaphragm 274 adjacent its inner end 276. Further, the inner end 276 includes a protuberance 278 formed on a surface opposite the channel 246, which is adapted for reception in a channel 280 formed in the sidewall 290 of the annular recess 244. The ramp 251 includes a notch 253 at its widest portion for locking reception against the tab 293 formed in the sidewall 291.

The ramped outer rim 252 aids insertion of the retainer ring 242 within the annular recess 244, which is adapted to receive the base 192 of the retainer ring 242 with the collar 240 of the elastomeric diaphragm 274 secured therebetween. Further, because of a preferred tight friction fit, it is preferred to lubricate the ring 242 prior to insertion. When fully inserted, the flange 256 on the inner rim 250 is received within the channel 246 formed in the diaphragm 274 adjacent its inner end 276. This forces the protuberance 278 formed on a surface of the diaphragm 274 opposite the channel 246 into the channel 280 formed in the sidewall 290 of the annular recess 244. Further, upon full insertion the tab 293 locks against the notch 253 to prevent inadvertent dislodging of the retainer ring 242. Once the lubricant dries or evaporates, the diaphragm 274 is installed for operation.

Concerning all of the several embodiments, the distal end 88 of the actuator rod 84 extends through a central opening 106 in an end wall of housing section 66, sealed by an O-ring 108, and terminates in a reaction plate 110 which wholly closes the distal end 88 of the actuator rod 84. The O-ring 108 seals the second service brake chamber 31 from the first spring brake chamber 76. The end of the reaction plate 110 abuts the pressure plate 36 when both the emergency and service brakes are not engaged.

The actuator rod 84 preferably accommodates a brake release caging rod 118 disposed coaxially therein and having a first end 120 and a second end 122. The first end 120 extends through a coaxial bore in the stem 96 of the pressure plate 92 and through a coaxial aperture in an end wall of the housing portion 68 coaxial with the annular recess 98. The second end 122 of the caging rod 118 mounts an enlarged plate 124. The caging rod 118 is used to manually release the spring brake or to ensure that the compression spring 82 will remain compressed (or caged) when maintenance functions are performed on the brake assembly. As seen in FIG. 1, the plate 124 has an outer diameter which generally corresponds to, or just slightly less than, the inner diameter of the actuator rod 84.

It will be understood that the caging rod 118 preferably is a bolt or the like threaded into a fixed threaded opening such as the threaded collar 128 mounted, such as by welding, to the end wall of housing section 68 coaxial with the annular recess 98. A hex-head nut 130 is fixedly attached to the first end 120 of the caging rod 118 to facilitate threading the rod 118 into and out of the spring brake 14 by a common wrench or the like.

An inwardly directed annular shoulder 132 is provided on the stem 96 of the pressure plate 92 to provide positive engagement with the proximal end 86 of the actuator rod 84 when the actuator rod 84 is actuated and further serves as an engagement surface for the plate 124 on the second end 122 of the caging rod 118 against which the plate 124 will bear when the caging rod 118 is withdrawn. Upon withdrawal, the caging rod 118 retains the compression spring 82 in its compressed or caged state. Otherwise, the caging rod 118 extends toward the distal end 88 of the actuator rod 84 by a sufficient distance to allow the actuator rod 84 to extend its full length of travel without engagement between the shoulder 132 and the plate 124 of the caging rod 118.

During normal operation of the brake actuator 10, the actuator rod 84 will be in the fully retracted position, as depicted in FIG. 1, by means of compressed air which is introduced through the spring brake port 80 in housing section 66 and maintained in the first spring brake chamber 76. To operate the service brake 12, compressed air is introduced through an air service port (not shown) in housing section 22 into the second service brake chamber 31 to force the diaphragm 32 and the pressure plate 36 against the force of the spring 48 to actuate the push rod 18. As the diaphragm 32 is actuated, any fluid in the first service brake chamber 30 is compressed and exhausted through the weep holes 62 in the housing section 20.

When the compressed air is exhausted from the first spring brake chamber 76, the compression spring 82 forces the pressure plate 92 and the actuator rod 84, integrally attached to the pressure plate 92, in the direction of the brake push rod 18 of the service brake 12. The force of the spring 82, when released, causes the actuator rod 84 to be extended through the central opening 106 which, in turn, causes the reaction plate 110 to apply a force to the pressure plate 36. This action causes the service brake push rod 18 to be actuated and the brake to be applied. When the emergency brake is to be released, compressed fluid is once again introduced into the first spring brake chamber 76 through the spring brake port 80. The force of the compressed fluid against the elastomeric diaphragm 74 urges the pressure plate 92. the actuator rod 84, and the spring 82 toward the retracted position depicted in FIG. 1. As the spring 82 is retracted, fluid in second spring brake chamber 78 exhausts through the weep holes 100.

It will be understood that mounting studs 136 are provided to mount the brake actuating unit 10 onto a vehicle.

Reasonable variation and modification are possible within the spirit of the foregoing specification and drawings without departing from the scope of the invention.

What is claimed is:

1. In a brake actuating mechanism of the type comprising:
   a housing having first and second end walls with an opening centrally disposed in the first end wall;
   an elastomeric diaphragm suspended within the housing and dividing the interior thereof into a first chamber and a second chamber, said diaphragm having a centrally disposed aperture defined by an annular edge, said aperture being substantially axially aligned with the opening;
   a pressure plate disposed within the second chamber;
   a cylindrical brake actuating rod disposed in the first chamber for reciprocating movement relative to the housing and having a first end extending through the opening in the first end wall and a second end extending through the aperture in the diaphragm, the annular edge thereof in sealing engagement with one of the pressure plate and the actuating rod to form an airtight seal, the pressure plate being securely attached to the actuating rod second end; and
   a spring disposed within the second chamber between the pressure plate and the second end wall;
   the improvement comprising:
   the pressure plate including a collar adjacent to the rod and extending, through the diaphragm aperture; and
   a retainer ring surrounding the actuating rod and in press-fit engagement with at least one of the pressure plate, the diaphragm, and the actuating rod to secure the annular edge of the diaphragm against at least one of the pressure plate and the actuating rod in sealing engagement.

2. A brake actuating mechanism according to claim 1 wherein the pressure plate includes an annular recess and the retainer ring secures the annular edge of the diaphragm against the pressure plate within the annular recess.

3. A brake actuating mechanism according to claim 1 wherein the retainer ring has an inner rim frictionally secured against at least one of the pressure plate, the diaphragm, and the actuating rod.

4. A brake actuating mechanism according to claim 3 wherein the pressure plate includes an annular recess and the retainer ring secures the annular edge of the diaphragm against the pressure plate within the annular recess.

5. A brake actuating mechanism according to claim 4 wherein the retainer ring includes a base with fingers radiating inwardly therefrom, and the fingers are in frictional engagement with at least one of the pressure plate, the diaphragm, and the actuating rod.

6. A brake actuating mechanism according to claim 5 wherein the pressure plate includes an annular recess and the retainer ring secures the annular edge of the diaphragm against the pressure plate within the annular recess.

7. A brake actuating mechanism according to claim 1 wherein the retainer ring includes a base with fingers radiating inwardly therefrom, and the fingers are in frictional engagement with at least one of the pressure plate, the diaphragm, and the actuating rod.

8. In a brake actuating mechanism of the type comprising:
   a housing having first and second end walls with an opening centrally disposed in the first end wall;
   an elastomeric diaphragm suspended within the housing and dividing the interior thereof into a first chamber and a second chamber, said diaphragm having a centrally disposed aperture defined by an annular edge, said aperture being substantially axially aligned with the opening;
   a pressure plate disposed within the second chamber;
   a cylindrical brake actuating rod disposed in the first chamber for reciprocating movement relative to the housing and having a first end extending through the opening in the first end wall and a second end extending through the aperture in the diaphragm, the annular edge thereof in sealing engagement with one of the pressure plate and the actuating rod to form an airtight seal, the pressure plate being securely attached to the actuating rod second end; and
   a spring disposed within the second chamber between the pressure plate and the second end wall;
   the improvement comprising:
   a retainer ring surrounding the actuating rod and in press-fit engagement with at least one of the pressure plate, the diaphragm, and the actuating rod to secure the annular edge of the diaphragm against at least one of the pressure plate and the actuating rod in sealing engagement;
   the pressure plate including an annular recess; and
   the retainer ring including a ramp disposed inwardly from an inner rim and an annular flange medially disposed about an outer rim;
   wherein the ramp cams against a first wall of the annular recess, and the flange is received in a first channel within the diaphragm, whereby the retainer ring secures the annular edge of the diaphragm within the annular recess.

9. A brake actuating mechanism according to claim 8 wherein the pressure plate has a second wall with an annular shoulder, and the ramp terminates at an annular notch adjacent its widest portion, whereby the retainer ring is blocked against outward movement by engagement of the annular notch against the shoulder.

10. A brake actuating mechanism according to claim 8 wherein:
    the pressure plate includes a collar between the annular recess and the actuating rod;
    the collar extends through the diaphragm; and
    the retainer ring is press-fit over the collar to secure the annular edge of the diaphragm against the pressure plate within the annular recess and with the ramp frictionally secured against the collar.

11. A brake actuating mechanism according to claim 9 wherein the annular recess further includes a second wall disposed opposite the first wall and having a second channel for receiving a protuberance disposed on a face of the diaphragm opposite the first channel.

12. A brake actuating mechanism according to claim 10 wherein the second wall has an annular shoulder, and the ramp terminates at an annular notch adjacent its widest portion, whereby the retainer ring is blocked against outward movement by engagement of the annular notch against the shoulder.

13. A brake actuating mechanism according to claim 8 wherein the annular recess further includes a second wall disposed opposite the first wall and having a second channel for receiving a protuberance disposed on a face of the diaphragm opposite the first channel.

* * * * *

UNITED STATES PATENT AND TRADEMARK OFFICE
CERTIFICATE OF CORRECTION

PATENT NO. : 6,164,187
DATED : 12/26/00
INVENTOR(S) : Steven M. Stojic

It is certified that error appears in the above-identified patent and that said Letters Patent is hereby corrected as shown below:

Claim 1, column 7, line 17, "scaling" should read --sealing--.
Claim 1, column 7, line 25 "," after "extending" should be deleted.

Signed and Sealed this

Twenty-ninth Day of May, 2001

Attest:

NICHOLAS P. GODICI

Attesting Officer           Acting Director of the United States Patent and Trademark Office